United States Patent
Li et al.

(10) Patent No.: US 11,505,098 B2
(45) Date of Patent: Nov. 22, 2022

(54) TEMPERATURE CONTROL METHOD, DEVICE AND SYSTEM FOR VEHICLE SEAT HEATING

(71) Applicant: Guangzhou Automobile Group Co., Ltd., Guangdong (CN)

(72) Inventors: Jinghua Li, Guangdong (CN); Kaiwen Jiang, Guangdong (CN); Liheng Hou, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 773 days.

(21) Appl. No.: 16/304,141

(22) PCT Filed: Dec. 29, 2017

(86) PCT No.: PCT/CN2017/119933
§ 371 (c)(1),
(2) Date: Nov. 22, 2018

(87) PCT Pub. No.: WO2018/121748
PCT Pub. Date: Jul. 5, 2018

(65) Prior Publication Data
US 2020/0317098 A1 Oct. 8, 2020

(30) Foreign Application Priority Data
Dec. 30, 2016 (CN) .......................... 201611261427.2

(51) Int. Cl.
*G06F 11/30* (2006.01)
*B60N 2/56* (2006.01)
*G01K 7/22* (2006.01)
(52) U.S. Cl.
CPC ............. *B60N 2/5678* (2013.01); *G01K 7/22* (2013.01)

(58) Field of Classification Search
CPC .................................................. B60N 2/5678
See application file for complete search history.

(56) References Cited

U.S. PATENT DOCUMENTS

2005/0040682 A1    2/2005   Topp

FOREIGN PATENT DOCUMENTS

| CN | 101587357 A | 11/2009 |
|----|-------------|---------|
| CN | 102656052 A | 9/2012  |

(Continued)

OTHER PUBLICATIONS

International Search Report for PCT application No. PCT/CN2017/119933 filed on Dec. 29, 2017, dated Mar. 22, 2018.

*Primary Examiner* — Phuong Huynh
(74) *Attorney, Agent, or Firm* — ScienBiziP, P.C.

(57) ABSTRACT

A temperature control method for vehicle seat heating includes: when turning on or switching to a heating level, determining a heating period at present according to a temperature value corresponding to a current Negative Temperature Coefficient (NTC) sensor, the heating period including an initial heating stage, an approaching stage and a steady stage; and segmentally controlling the on-off of a seat heating apparatus according to a heating strategy corresponding to each heating period, so that the seat surface temperature reaches to and stabilizes at an expected target temperature of the level. Further disclosed are a corresponding temperature control apparatus for the vehicle seat heating and a temperature control system for the vehicle seat heating. By adopting the temperature control method for the vehicle seat heating, the seat surface temperature can quickly reach to and stabilize at the expected temperature value, and thus the use experience of a user is improved.

20 Claims, 4 Drawing Sheets

(56) References Cited

FOREIGN PATENT DOCUMENTS

| | | | |
|---|---|---|---|
| CN | 103448589 | A | 12/2013 |
| CN | 204222694 | U | 3/2015 |
| CN | 104684442 | A | 6/2015 |
| CN | 104859501 | * | 8/2015 |
| CN | 104859501 | A | 8/2015 |
| CN | 105813505 | A | 7/2016 |
| CN | 106133450 | A | 11/2016 |
| CN | 106740341 | A | 5/2017 |
| JP | 2003042590 | A | 2/2003 |
| JP | 5708292 | B2 | 4/2015 |

* cited by examiner

TEMPERATURE CONTROL METHOD, DEVICE AND SYSTEM FOR VEHICLE SEAT HEATING

This application claims priority to Chinese Patent Application No. 201611261427.2 entitled "Temperature Control Method, Apparatus and System for Vehicle Seat Heating", filed to Chinese Patent Office on Dec. 30, 2016, the contents of which are incorporated herein by reference in its entirety.

TECHNICAL FIELD

The present disclosure relates to the technical field of vehicle seat heating control, and more particularly, to a temperature control method, apparatus and system for vehicle seat heating.

BACKGROUND

Usually, the seat heating of cars are controlled by setting the Heated/Ventilated Seat Modules (HVSMs) in the seats.

For the existing HVSM module, in order to improve comfort of the seat heating, the following control objectives are expected:

a) The seat surface temperature is increased to an expected temperature value from an environmental temperature as soon as possible and stabilizes around this temperature value, i.e., it is expected that a time from the seat heating is turned on to the seat surface temperature is stabilized at the expected value is as short as possible.

b) After being increased to the expected temperature value, the seat surface temperature should change within a certain set fluctuation range all the time (for example, the fluctuation range is generally set at ±1° C.). The seat surface temperature should not exceed the expected value, particularly at a highest level.

In the conventional art, to achieve the above goals, a seat heating pad supplier generally measures corresponding resistances of an Negative Temperature Coefficient (NTC) temperature sensor in a seat heating apparatus (such as a heating pad) when the seat surface temperature stabilizes at temperature values required by three heating levels in a certain set constant environmental temperature (in terms of a demand of a vehicle plant. For example, 23° C. required by General Motors Corporation and 30° C. required by Ford Motor Company). After obtaining the NTC resistances corresponding to the three heating levels, an HVSM module supplier takes the NCT resistances as target values in a control algorithm. When the seat heating is turned on and the NTC resistance is reduced along with the increase of the temperature to be close to a target resistance at a certain distance, a controller in the HVSM module starts to intervene the temperature control, turns off/on the seat heating at a certain duty ratio, and gradually changes a duty ratio of a control circuit, so that the NTC resistance approaches to the target resistance slowly and smoothly. When the NTC resistance reaches to the target resistance, the controller controls the seat heating work at a fixed duty ratio, so that the seat surface temperature stabilizes around the expected value.

However, an existing control method of a present seat heating controller supplier generally can meet the objective b). With regard to the objective a), because of the problems of a time point when the controller intervenes the temperature control and the temperature control method, there are the following three situations: first, the time when the controller intervenes the temperature control is too early, which results in that the seat surface temperature is reduced due to a heating power before reaching to the expected value, the heating rate is slowed down and the seat surface temperature may reach to the expected temperature value for a relatively long time (for example, some vehicle needs 40 min to complete the above process); second, the time when the controller intervenes the temperature control is too late, resulting in that the seat surface temperature exceeds the expected value (or referred to as an overshoot); and third, during a process from the controller intervenes the temperature control to the seat surface temperature stabilizes at last, since the control method is not perfect enough, the fluctuation range of the seat surface temperature is relatively large, for example, beyond ±1° C.

Therefore, the existing temperature control method and the effect for the vehicle seat heating have more or less shortages, such as, the seats are heated too slowly or overheated, or the seats is cold or hot now and then, so that the user experience is affected.

SUMMARY

The technical problem to be solved by the present disclosure is to provide a temperature control method, apparatus and system for vehicle seat heating, which may enable a temperature on the surface of a vehicle seat to quickly reach to an expected value and stabilize at the expected value.

In order to solve the above technical problems, according to one aspect of the embodiments of the present disclosure, a temperature control method for vehicle seat heating is provided, and the method may include the following steps.

When a certain heating level is turned on or is switched to, a heating period at present is determined according to a temperature value corresponding to a current NTC sensor, the heating period including an initial heating stage, an approaching stage and a steady stage.

The on-off of a seat heating apparatus is controlled segmentally according to a heating strategy corresponding to each heating period, so that the seat surface temperature reaches to and stabilizes at an expected target temperature of the level.

In another embodiment, the step that when a certain heating level is turned on or is switched to, a heating period at present is determined according to a temperature value corresponding to a current NTC sensor may further Include the following steps.

The temperature value corresponding to the current NTC sensor is compared with a predetermined temperature threshold value.

When a comparison result is that the temperature value corresponding to the current NTC sensor is higher than or equal to the temperature threshold value, the heating period at present is determined as the steady stage, or otherwise, the heating period at present is determined as the initial heating stage.

In another embodiment, the step that the on-off of a seat heating apparatus is controlled according to a heating strategy corresponding to each heating period, so that the seat surface temperature reaches to and stabilizes at an expected target temperature of the level may specifically include the following steps.

If the heating period at present is the initial heating stage, the seat heating apparatus is controlled to be in an on state all the time at the heating level till the temperature value corresponding to the NTC sensor reaches to a target temperature corresponding to the level in the initial heating stage and the process goes to approaching stage control.

In an approaching stage control process, according to an approaching stage control strategy of the level, the temperature value corresponding to the NTC sensor is enabled to gradually approach to an NTC target temperature corresponding to the level by controlling the seat heating apparatus to turn on and turn off intermittently, and after a predetermined condition is reached, the process goes to steady stage control.

In a steady stage control process, according to a steady stage control strategy of the level, the temperature value corresponding to the NTC sensor is enabled to fluctuate up and down at the NTC target temperature corresponding to the level by controlling the seat heating apparatus to turn on and turn off intermittently.

In another embodiment, the step that the on-off of a seat heating apparatus is controlled according to a heating strategy corresponding to each heating period, so that the seat surface temperature reaches to and stabilizes at an expected target temperature of the level may specifically include the following step.

If the heating period at present is the steady stage, according to a steady stage control strategy of the level, the temperature value corresponding to the NTC sensor is enabled to fluctuate up and down at the NTC target temperature corresponding to the level by controlling the seat heating apparatus to turn on and turn off Intermittently.

In another embodiment, the step that in an approaching stage control process, according to an approaching stage control strategy of the level, the temperature value corresponding to the NTC sensor is enabled to gradually approach to an NTC target temperature corresponding to the level by controlling the seat heating apparatus to turn on and turn off intermittently, and after a predetermined condition is reached, the process goes to steady stage control specifically is as follows.

When the seat heating is performed and when the temperature value corresponding to the NTC sensor is Increased to a corresponding off point temperature value in each on-off circulation, the seat heating apparatus is turned off; and after the seat heating apparatus is turned off, when the temperature value corresponding to the NTC sensor is reduced to a corresponding on point temperature value, the seat heating apparatus is turned on.

In another embodiment, the off point temperature value and the on point temperature value in the each on-off circulation are calculated via the following formula.

$$T\_NTC\_HeatTurnOFF(n)=T\_NTC\_HeatTurnON(n-1)+deltaT\_NTC\_Neg-deltaT(n+1);$$

$$T\_NTC\_HeatTurnON(n)=T\_NTC\_HeatTurnOFF(n-1)-deltaT\_NTC\_Neg;$$

$$T\_NTC\_HeatTurnOFF(0)=T\_NTC\_MAX\_Lx;$$

Where, the n is an n time in the approaching stage that the heating is turned on or turned off in the current circulation, the T_NTC_HeatTurnOFF(n) is an off point temperature value when the heating is turned off at an $n^{th}$ time, the T_NTC_HeatTurnON(n−1) is an on point temperature value when the heating is turned on at an $(n-1)^{th}$ time, the T_NTC_HeatTurnON(n) is an on point temperature value when the heating is turned on at an $n^{th}$ time, T_NTC_HeatTurnOFF(n−1) is an off point temperature value when the heating is turned off at an $(n-1)^{th}$ time, the deltaT_NTC-Neg is a predetermined temperature reduction value, the deltaT (n+1) is a predetermined descending power function, and the T_NTC_MAX-Lx is a target temperature corresponding to the level in the initial heating stage.

In another embodiment, the step that in an approaching stage control process, according to an approaching stage control strategy of the level, the temperature value corresponding to the NTC sensor is enabled to gradually approach to an NTC target temperature corresponding to the level by controlling the seat heating apparatus to turn on and turn off intermittently, and after a predetermined condition is reached, the process goes to steady stage control may further include the following step.

When the following formula is met, the temperature value corresponding to the NTC sensor is determined to approach to the NTC target temperature corresponding to the level and the process goes to the steady stage control:

$$T\_NTC\_HeatTurnOFF-(T\_NTC\_Control\_Lx+deltaT\_NTC\_Neg/2)<=deltaT\_NTC\_ApprochToStedy$$

Where the T_NTC_Control_Lx is the NTC target temperature corresponding to the level, the deltaT_NTC-Neg is a predetermined temperature reduction value, and the deltaT_NTC_ApprochToStedy is a predetermined difference judgment threshold value.

In another embodiment, the step that in a steady stage control process, according to a steady stage control strategy of the level, the temperature value corresponding to the NTC sensor is enabled to fluctuate up and down at the NTC target temperature corresponding to the level by controlling the seat heating apparatus to turn on and turn off intermittently specifically is as follows.

When the seat heating is performed and when the temperature value corresponding to the NTC sensor is increased to an off point temperature value in the steady stage, the seat heating apparatus is turned off; and after the seat heating apparatus is turned off, when the temperature value corresponding to the NTC sensor is reduced to an on point temperature value in the steady stage, the seat heating apparatus Is turned on.

In another embodiment, the off point temperature value and the on point temperature value in the steady stage are calculated via the following formula.

$$T\_NTC\_HeatTurnOFF=T\_NTC\_Control\_Lx+deltaT\_NTC\_Neg/2;$$

$$T\_NTC\_HeatTurnON=T\_NTC\_Control\_Lx-deltaT\_NTC\_Neg/2;$$

Where the T_NTC_HeatTurnOFF is the off point temperature value in the steady stage, the T_NTC_HeatTurnON is the on point temperature value in the steady stage, the T_NTC_Control_Lx is an NTC target temperature corresponding to the level, and the deltaT_NTC_Neg is a predetermined temperature reduction value.

In another embodiment, the temperature control method may further include the following step.

A target temperature, an NTC target temperature, a temperature reduction value, a difference judgment threshold value and an ascending power function corresponding to the each heating level in the initial heating stage are preseted and are stored.

According to another aspect of the embodiments of the present disclosure, a temperature control apparatus for vehicle seat heating is further provided, and the apparatus may include a level heating period judgment unit and a segmental control unit.

The level heating period judgment unit is configured to determine, when a certain heating level is turned on or is switched to, a heating period at present according to a temperature value corresponding to a current NTC sensor, the heating period including an initial heating stage, an approaching stage and a steady stage.

The segmental control unit is configured to segmentally control on-off of a seat heating apparatus according to a heating strategy corresponding to each heating period, so that the seat surface temperature reaches to and stabilizes at an expected target temperature of the level.

In another embodiment, the level heating period judgment unit may further include a comparison unit and a heating period determination unit.

The comparison unit is configured to compare a temperature value corresponding to the current NTC sensor with a predetermined temperature threshold value.

The heating period determination unit is configured to determine, when a comparison result is that the temperature value corresponding to the current NTC sensor is higher than or equal to the temperature threshold value, the heating period at present as the steady stage, or otherwise, determine the heating period at present as the initial heating stage.

In another embodiment, the segmental control unit may include an initial heating stage control unit, an approaching stage control unit and a steady stage control unit.

The initial heating stage control unit is configured to control the seat heating apparatus to be in an on state all the time at the heating level till the temperature value corresponding to the NTC sensor reaches to a target temperature corresponding to the level in the initial heating stage.

The approaching stage control unit is configured to enable, when the heating period at present is in the approaching stage, according to an approaching stage control strategy of the level, the temperature value corresponding to the NTC sensor to gradually approach to an NTC target temperature corresponding to the level by controlling the seat heating apparatus to turn on and turn off intermittently.

The steady stage control unit is configured to enable, when the heating period at present is in the steady stage, according to a steady stage control strategy of the level, the temperature value corresponding to the NTC sensor to fluctuate up and down at the NTC target temperature corresponding to the level by controlling the seat heating apparatus to turn on and turn off intermittently.

In another embodiment, the approaching stage control unit may include an approaching stage heating switch control unit.

The approaching stage heating switch control unit is configured to turn off, when the seat heating is performed and when the temperature value corresponding to the NTC sensor is increased to a corresponding off point temperature value in each on-off circulation, the seat heating apparatus; and turn on, after the seat heating apparatus is turned off, when the temperature value corresponding to the NTC sensor is reduced to a corresponding on point temperature value, the seat heating apparatus.

In another embodiment, the off point temperature value and the on point temperature value in the each on-off circulation are calculated via the following formula.

$$T\_NTC\_HeatTurnOFF(n) = T\_NTC\_HeatTurnON(n-1) + deltaT\_NTC\_Neg - deltaT(n+1);$$

$$T\_NTC\_HeatTurnON(n) = T\_NTC\_HeatTurnOFF(n-1) - deltaT\_NTC\_Neg;$$

$$T\_NTC\_HeatTurnOFF(0) = T\_NTC\_MAX\_Lx;$$

Where, the n is an $n^{th}$ time in the approaching stage that the heating is turned on or turned off in the current circulation, the T_NTC_HeatTurnOFF(n) is an off point temperature value when the heating is turned off at an $n^{th}$ time, the T_NTC_HeatTurnON(n-1) is an on point temperature value when the heating is turned on at an $(n-1)^{th}$ time, the T_NTC_HeatTurnON(n) is an on point temperature value when the heating is turned on at an $n^{th}$ time, T_NTC_HeatTurnOFF(n-1) is an off point temperature value when the heating is turned off at an $(n-1)^{th}$ time, the deltaT_NTC-Neg is a predetermined temperature reduction value, the deltaT(n+1) is a predetermined descending power function, and the T_NTC_MAX-Lx is a target temperature corresponding to the level in the initial heating stage.

In another embodiment, the approaching stage control unit may further include an approaching judgment unit.

The approaching judgment unit is configured to determine, when the following formula is met, the temperature value corresponding to the NTC sensor to approach to the NTC target temperature corresponding to the level:

$$T\_NTC\_HeatTurnOFF - (T\_NTC\_Control\_Lx + deltaT\_NTC\_Neg/2) <= deltaT\_NTC\_ApprochToStedy$$

Where the T_NTC_Control_Lx is the NTC target temperature corresponding to the level, the deltaT_NTC-Neg is a predetermined temperature reduction value, and the deltaT_NTC_ApprochToStedy is a predetermined difference judgment threshold value.

In another embodiment, the steady stage control unit may specifically include a steady stage heating switch control unit.

The steady stage heating switch control unit is configured to turn off, when the seat heating is performed and when the temperature value corresponding to the NTC sensor is Increased to an off point temperature value in the steady stage, the seat heating apparatus; and turn on, after the seat heating apparatus is turned off, when the temperature value corresponding to the NTC sensor is reduced to an on point temperature value in the steady stage, the seat heating apparatus.

In another embodiment, the off point temperature value and the on point temperature value in the steady stage are calculated via the following formula.

$$T\_NTC\_HeatTurnOFF = T\_NTC\_Control\_Lx + deltaT\_NTC\_Neg/2;$$

$$T\_NTC\_HeatTurnON = T\_NTC\_Control\_Lx - deltaT\_NTC\_Neg/2:$$

Where the T_NTC_HeatTurnOFF is the off point temperature value in the steady stage, the T_NTC_HeatTurnON is the on point temperature value in the steady stage, the T_NTC_Control_Lx is an NTC target temperature corresponding to the level, and the deltaT_NTC_Neg is a predetermined temperature reduction value.

In another embodiment, the temperature control apparatus may further include a presetting and storage unit.

The presetting and storage unit is configured to preset a target temperature, an NTC target temperature, a temperature reduction value, a temperature threshold value, a difference judgment threshold value and an ascending power function corresponding to the each heating level in the initial heating stage and store all.

According to another aspect of the embodiments of the present disclosure, a temperature control system for vehicle seat heating is further provided, and the system may include a temperature sensor, a control apparatus and a seat heating apparatus.

The temperature sensor is arranged in a vehicle seat and is configured to detect a temperature on the surface of the vehicle seat.

The control apparatus includes the temperature control apparatus for the vehicle seat heating.

The seat heating apparatus is configured to heat the vehicle seat according to the control of a segmental control apparatus.

By implementing the embodiments of the present disclosure, the following technical effects are achieved.

First of all, in the temperature control method and apparatus for the vehicle seat heating provided by the present disclosure, when the seat is heated, a segmental temperature control strategy is adopted, so the temperature control Intervention time and the control process are more reasonable and the seat surface temperature can quickly reach to and stabilize at the expected value; specifically, when the seat heating is turned on for a first time, a current level is adopted to heat at a full power and the seat surface temperature rises quickly; when the seat surface NTC temperature value reaches to an initial target value, the seat heating apparatus is controlled according to the approaching stage control strategy, so that the seat heating apparatus is turned on and turned off intermittently and approaches to the expected temperature value quickly; and then, the steady stage control is entered and the seat surface temperature stabilizes around the expected temperature value all the time.

Then, after the heating level is switched, the present disclosure will correspondingly adjust control parameters in each heating stage, thus preventing the exaggerated change of the seat surface temperature.

By implementing the embodiments of the present disclosure, the comfort of the seat heating may be improved and the user may feel that the heating is quicker and the temperature is steadier.

BRIEF DESCRIPTION OF THE DRAWINGS

In order to describe the technical solutions of the embodiments of the present disclosure more clearly, the drawings required to be used in the embodiments of the present disclosure will be simply introduced below. Obviously, the drawings described below are only some embodiments of the present disclosure. Other drawings may further be obtained by those skilled in the art according to these drawings without creative work.

DETAILED DESCRIPTION OF THE EMBODIMENTS

A clear and complete description of the technical solutions in the present disclosure will be given below, in combination with the accompanying drawings in the embodiments of the present disclosure. Apparently, the embodiments described below are a part, but not all, of the embodiments of the present disclosure. All of the other embodiments, obtained by those of ordinary skill in the art based on the embodiments of the present disclosure without any inventive efforts, fall into the protection scope of the present disclosure.

Figure 1:
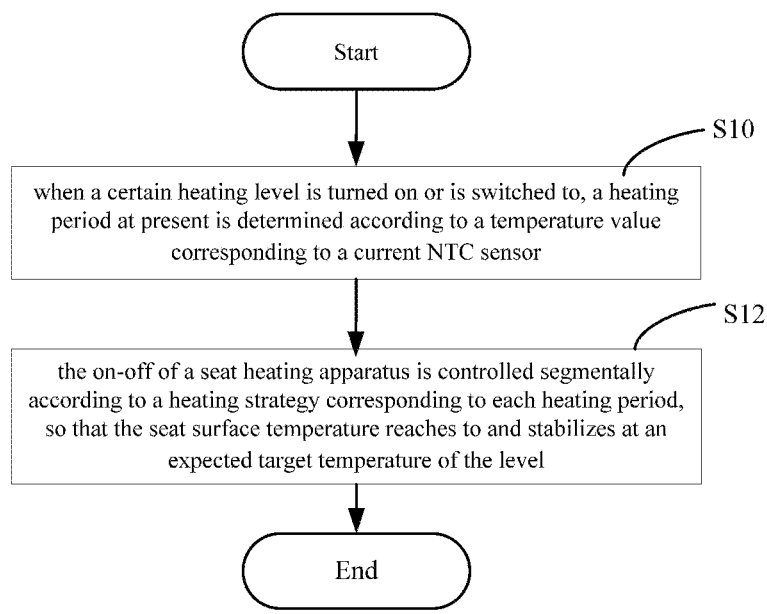
FIG. 1 is a flowchart of a temperature control method for vehicle seat heating provided by the embodiment of the present disclosure.

The present disclosure will be further described below in detail. As shown in FIG. 1, it is a main flowchart schematic diagram of a temperature control method for vehicle seat heating provided by the present disclosure. In this embodiment, the method may include the following steps.

At S10, when a certain heating level is turned on or is switched to, a heating period at present is determined according to a temperature value corresponding to a current NTC sensor, the heating period including an Initial heating stage, an approaching stage and a steady stage.

At S12, on-off of a seat heating apparatus is controlled segmentally according to a heating strategy corresponding to each heating period, so that the seat surface temperature reaches to and stabilizes at an expected target temperature of the level.

Figure 2:
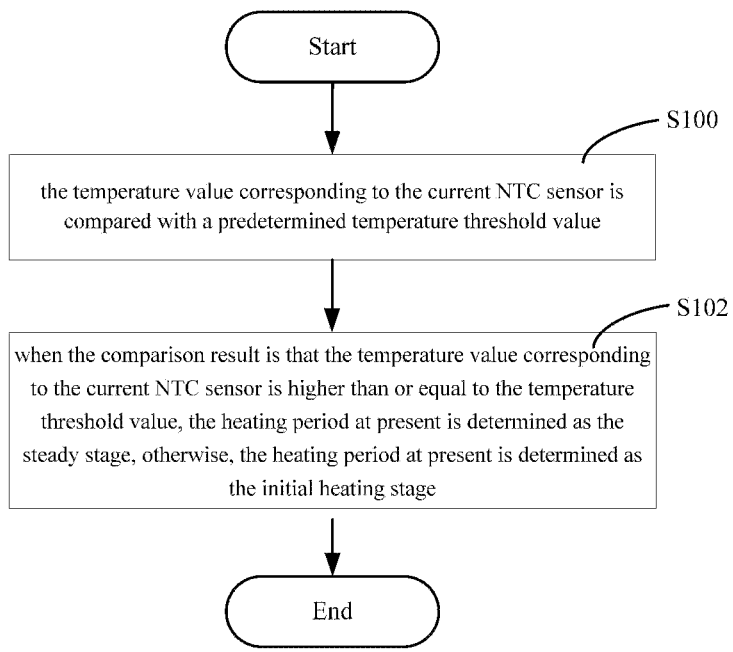
FIG. 2 is a more detailed flowchart of a step S10 in FIG. 1.
Figure 3:
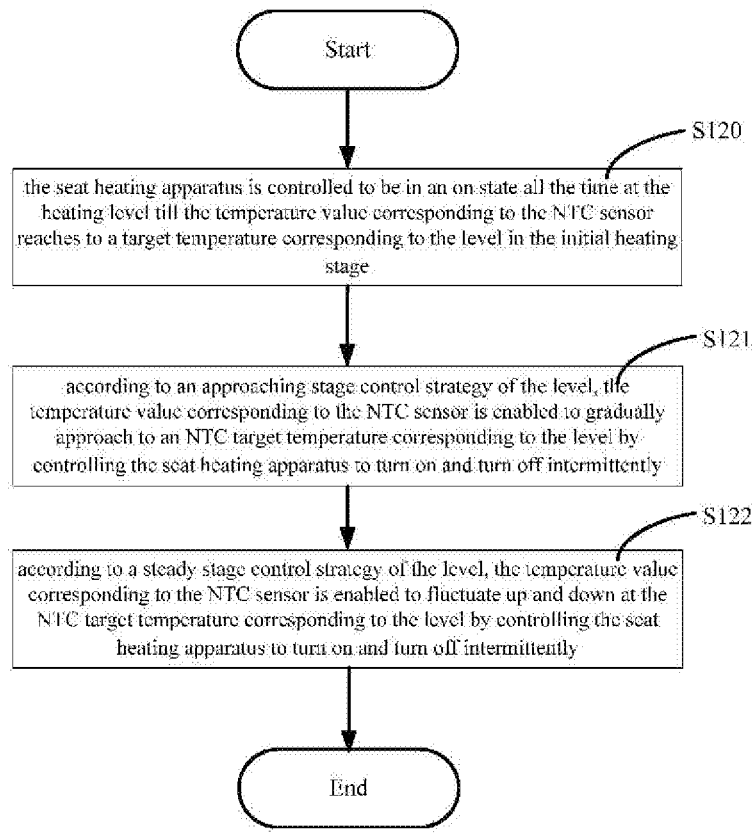
FIG. 3 is a more detailed flowchart of a step S12 in FIG. 1.

Referring to FIG. 2 and FIG. 3, the step S10 may further include the following steps.

At S100, a temperature value corresponding to the current NTC sensor is compared with a predetermined temperature threshold value.

At S102, when a comparison result is that the temperature value corresponding to the current NTC sensor is higher than or equal to the temperature threshold value, the heating period at present is determined as the steady stage, or otherwise, the heating period at present is determined as the initial heating stage.

In another embodiment, the step S12 may specifically include the following steps.

If the heating period at present is the initial heating stage, the seat heating apparatus is controlled to be in an on state all the time at the heating level till the temperature value corresponding to the NTC sensor reaches to a target temperature corresponding to the level in the initial heating stage and the process goes to approaching stage control in the step S120.

At S121, in an approaching stage control process, according to an approaching stage control strategy of the level, the temperature value corresponding to the NTC sensor is enabled to gradually approach to an NTC target temperature corresponding to the level by controlling the seat heating apparatus to turn on and turn off intermittently, and after a predetermined condition is reached, the process goes to steady stage control.

At S122, in a steady stage control process, according to a steady stage control strategy of the level, the temperature value corresponding to the NTC sensor is enabled to fluctuate up and down at the NTC target temperature corresponding to the level by controlling the seat heating apparatus to turn on and turn off intermittently.

In another embodiment, if it is judged that the heating period at present Is the steady stage in the step S10, the step S12 only includes the step S122. That is, if the heating period at present is the steady stage, according to a steady stage control strategy of the level, the temperature value corresponding to the NTC sensor is enabled to fluctuate up and down at the NTC target temperature corresponding to the level by controlling the seat heating apparatus to turn on and turn off intermittently.

Further, in one embodiment of the present disclosure, the step S121 may include the following step.

When the seat heating is performed and when the temperature value corresponding to the NTC sensor is increased to a corresponding off point temperature value in each on-off circulation, the seat heating apparatus is turned off; and after the seat heating apparatus is turned off, when the temperature value corresponding to the NTC sensor is reduced to a corresponding on point temperature value, the seat heating apparatus is turned on.

In another embodiment, the off point temperature value and the on point temperature value in the each on-off circulation are calculated via the following formula.

$$T\_NTC\_HeatTurnOFF(n) = T\_NTC\_HeatTurnON(n-1) + \text{delta}T\_NTC\_Neg - \text{delta}T(n+1);$$

$$T\_NTC\_HeatTurnON(n) = T\_NTC\_HeatTurnOFF(n-1) - \text{delta}T\_NTC\_Neg;$$

$$T\_NTC\_HeatTurnOFF(0) = T\_NTC\_MAX\_Lx:$$

Where, the n is an $n^{th}$ time in the approaching stage that the heating is turned on or turned off in the current circulation, the T_NTC_HeatTurnOFF(n) is an off point temperature value when the heating is turned off at an $n^{th}$ time, the T_NTC_HeatTurnON(n−1) is an on point temperature value when the heating is turned on at an $(n−1)^{th}$ time, the T_NTC_HeatTurnON(n) is an on point temperature value when the heating is turned on at an $n^{th}$ time, T_NTC_HeatTurnOFF(n−1) is an off point temperature value when the heating is turned off at an $(n−1)^{th}$ time, the deltaT_NTC-Neg is a predetermined temperature reduction value, the deltaT (n+1) is a predetermined descending power function, and the T_NTC_MAX-Lx is a target temperature corresponding to the level in the initial heating stage.

It may be understood that, the off point temperature value and the on point temperature value in the approaching stage may be calculated in advance and are stored, and may also be calculated in real time in a heating control process.

The step S121 may further include the following steps.

When the following formula is met, the temperature value corresponding to the NTC sensor is determined to approach to the NTC target temperature corresponding to the level and the process goes to the steady stage control:

$$T\_NTC\_HeatTurnOFF - (T\_NTC\_Control\_Lx + \text{delta}T\_NTC\_Neg/2) <= \text{delta}T\_NTC\_ApprochToStedy$$

Where the T_NTC_Control_Lx is the NTC target temperature corresponding to the level, the deltaT_NTC-Neg is a predetermined temperature reduction value, and the deltaT_NTC_ApprochToStedy is a predetermined difference judgment threshold value.

Further, in one embodiment of the present disclosure, the step S122 specifically is as follows.

When the seat heating is performed and when the temperature value corresponding to the NTC sensor is increased to an off point temperature value in the steady stage, the seat heating apparatus is turned off; and after the seat heating apparatus is turned off, when the temperature value corresponding to the NTC sensor is reduced to an on point temperature value in the steady stage, the seat heating apparatus is turned on.

In another embodiment, the off point temperature value and the on point temperature value in the steady stage are calculated via the following formula.

$$T\_NTC\_HeatTurnOFF = T\_NTC\_Control\_Lx + \text{delta}T\_NTC\_Neg/2;$$

$$T\_NTC\_HeatTurnON = T\_NTC\_Control\_Lx - \text{delta}T\_NTC\_Neg/2:$$

Where the T_NTC_HeatTurnOFF is the off point temperature value in the steady stage, the T_NTC_HeatTurnON is the on point temperature value in the steady stage, the T_NTC_Control_Lx is an NTC target temperature corresponding to the level, and the deltaT_NTC_Neg is a predetermined temperature reduction value.

It may be understood that, the off point temperature value and the on point temperature value in the steady stage may be calculated in advance and are stored, and may also be calculated in real time in the heating control process.

It may be understood that the method further includes the following step.

A target temperature, an NTC target temperature, a temperature reduction value, a difference judgment threshold value and an ascending power function corresponding to the each heating level in the initial heating stage are preseted and are stored.

As shown in FIG. 3 to FIG. 6, a temperature control apparatus for vehicle seat heating provided by the present disclosure is shown. In this embodiment, the temperature control apparatus 1 for the vehicle seat heating may include a level heating period judgment unit 10 and a segmental control unit 12.

The level heating period judgment unit 10 is configured to determine, when a certain heating level is turned on or is switched to, a heating period at present according to a temperature value corresponding to a current NTC sensor, the heating period including an initial heating stage, an approaching stage and a steady stage.

The segmental control unit 12 is configured to segmentally control on-off of a seat heating apparatus according to a heating strategy corresponding to each heating period, so that the seat surface temperature reaches to and stabilizes at an expected target temperature of the level.

In another embodiment, the level heating period judgment unit 10 may further include a comparison unit 100 and a heating period determination unit 101.

The comparison unit 100 is configured to compare a temperature value corresponding to the current NTC sensor with a predetermined temperature threshold value.

The heating period determination unit 101 is configured to determine, when a comparison result of the comparison unit 100 is that the temperature value corresponding to the current NTC sensor is higher than or equal to the temperature threshold value, the heating period at present as the steady stage, or otherwise, determine the heating period at present as the initial heating stage.

In another embodiment, the segmental control unit 12 may include an initial heating stage control unit 120, an approaching stage control unit 121 and a steady stage control unit 122.

The initial heating stage control unit 120 is configured to control the seat heating apparatus to be in an on state all the time at the heating level till the temperature value corresponding to the NTC sensor reaches to a target temperature corresponding to the level in the initial heating stage.

The approaching stage control unit 121 is configured to enable, when the heating period at present is in the approaching stage, according to an approaching stage control strategy of the level, the temperature value corresponding to the NTC sensor to gradually approach to an NTC target temperature corresponding to the level by controlling the seat heating apparatus to turn on and turn off intermittently.

The steady stage control unit 122 is configured to enable, when the heating period at present is in the steady stage, according to a steady stage control strategy of the level, the temperature value corresponding to the NTC sensor to fluctuate up and down at the NTC target temperature corresponding to the level by controlling the seat heating apparatus to turn on and turn off intermittently.

In another embodiment, the approaching stage control unit 121 may include an approaching stage heating switch control unit 1210.

The approaching stage heating switch control unit 1210 is configured to turn off, when the seat heating is performed and when the temperature value corresponding to the NTC sensor is increased to a corresponding off point temperature value in each on-off circulation, the seat heating apparatus; and turn on, after the seat heating apparatus is turned off, when the temperature value corresponding to the NTC sensor is reduced to a corresponding on point temperature value, the seat heating apparatus.

In another embodiment, the off point temperature value and the on point temperature value in the each on-off circulation are calculated via the following formula.

$$T\_NTC\_HeatTurnOFF(n) = T\_NTC\_HeatTurnON(n-1) + deltaT\_NTC\_Neg - deltaT(n+1);$$

$$T\_NTC\_HeatTurnON(n) = T\_NTC\_HeatTurnOFF(n-1) - deltaT\_NTC\_Neg;$$

$$T\_NTC\_HeatTurnOFF(0) = T\_NTC\_MAX\_Lx;$$

Where, the n is an $n^{th}$ time in the approaching stage that the heating is turned on or turned off in the current circulation, the T_NTC_HeatTurnOFF(n) is an off point temperature value when the heating is turned off at an $n^{th}$ time, the T_NTC_HeatTurnON(n−1) is an on point temperature value when the heating is turned on at an $(n-1)^{th}$ time, the T_NTC_HeatTurnON(n) is an on point temperature value when the heating is turned on at an $n^{th}$ time, T_NTC_HeatTurnOFF(n−1) is an off point temperature value when the heating is turned off at an $(n-1)^{th}$ time, the deltaT_NTC-Neg is a predetermined temperature reduction value, the deltaT(n+1) is a predetermined descending power function, and the T_NTC_MAX-Lx is a target temperature corresponding to the level in the initial heating stage.

The approaching judgment unit 1211 is configured to determine, when the following formula is met, the temperature value corresponding to the NTC sensor to approach to the NTC target temperature corresponding to the level.

$$T\_NTC\_HeatTurnOFF - (T\_NTC\_Control\_Lx + deltaT\_NTC\_Neg/2) \le deltaT\_NTC\_ApprochToStedy$$

Where the T_NTC_Control_Lx is the NTC target temperature corresponding to the level, the deltaT_NTC-Neg is a predetermined temperature reduction value, and the deltaT_NTC_ApprochToStedy is a predetermined difference judgment threshold value.

In another embodiment, the steady stage control unit 122 may specifically include a steady stage heating switch control unit 1220.

The steady stage heating switch control unit 1220 is configured to turn off, when the seat heating is performed and when the temperature value corresponding to the NTC sensor is increased to an off point temperature value in the steady stage, the seat heating apparatus; and turn on, after the seat heating apparatus is turned off, when the temperature value corresponding to the NTC sensor is reduced to an on point temperature value in the steady stage, the seat heating apparatus.

In another embodiment, the off point temperature value and the on point temperature value in the steady stage are calculated via the following formula.

$$T\_NTC\_HeatTurnOFF = T\_NTC\_Control\_Lx + deltaT\_NTC\_Neg/2:$$

$$T\_NTC\_HeatTurnON = T\_NTC\_Control\_Lx - deltaT\_NTC\_Neg/2:$$

Where the T_NTC_HeatTurnOFF is the off point temperature value in the steady stage, the T_NTC_HeatTurnON is the on point temperature value in the steady stage, the T_NTC_Control_Lx is an NTC target temperature corresponding to the level, and the deltaT_NTC_Neg is a predetermined temperature reduction value.

In another embodiment, the temperature control apparatus 1 for the vehicle seat heating may further include a presetting and storage unit 14.

The presetting and storage unit 14 is configured to preset a target temperature, an NTC target temperature, a temperature reduction value, a temperature threshold value, a difference judgment threshold value and an ascending power function corresponding to the each heating level in the initial heating stage and store them.

According to another aspect of the embodiments of the present disclosure, a temperature control system for vehicle seat heating is further provided, and system may include a temperature sensor, a control apparatus and a seat heating apparatus.

The temperature sensor is arranged in a vehicle seat, is configured to detect a temperature on a surface of the vehicle seat and may be an NTC sensor in an HVSM module.

The control apparatus includes the temperature control apparatus 1 for the vehicle seat heating.

The seat heating apparatus Is configured to heat the vehicle seat according to the control of a segmental control apparatus.

Figure 4:
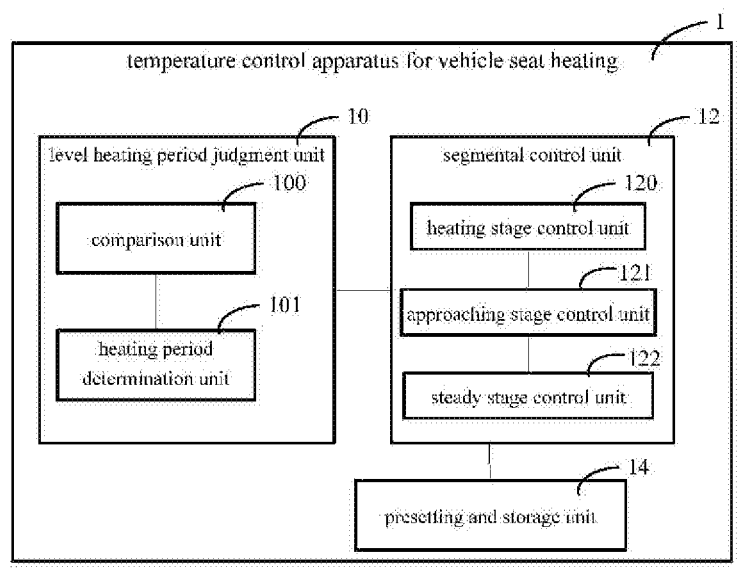
FIG. 4 is a structural schematic diagram of a temperature control apparatus for vehicle seat heating provided by the embodiment of the present disclosure.
Figure 5:
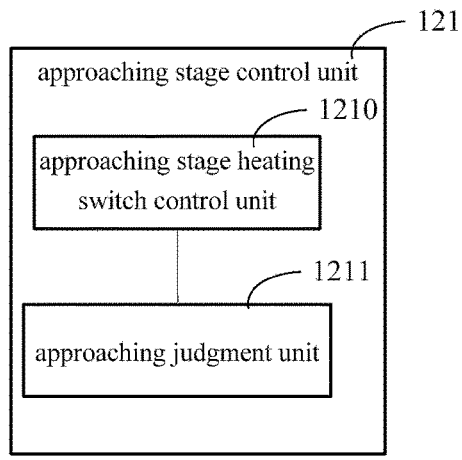
FIG. 5 is a structural schematic diagram of an embodiment of an approaching stage control unit in FIG. 4.
Figure 6:
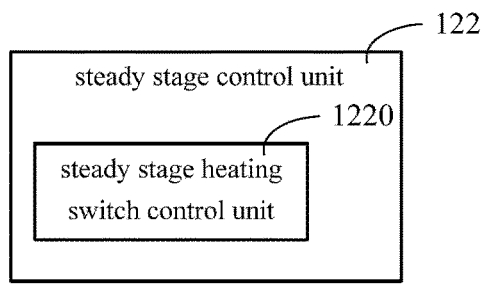
FIG. 6 is a structural schematic diagram of an embodiment of a steady stage control unit in FIG. 4.

More details may be referred to the foregoing description on FIG. 4 to FIG. 6 and will not be described in detail here.

In order to better understand the embodiments of the present disclosure, the present disclosure will be described below with reference to specific examples.

Figure 7:
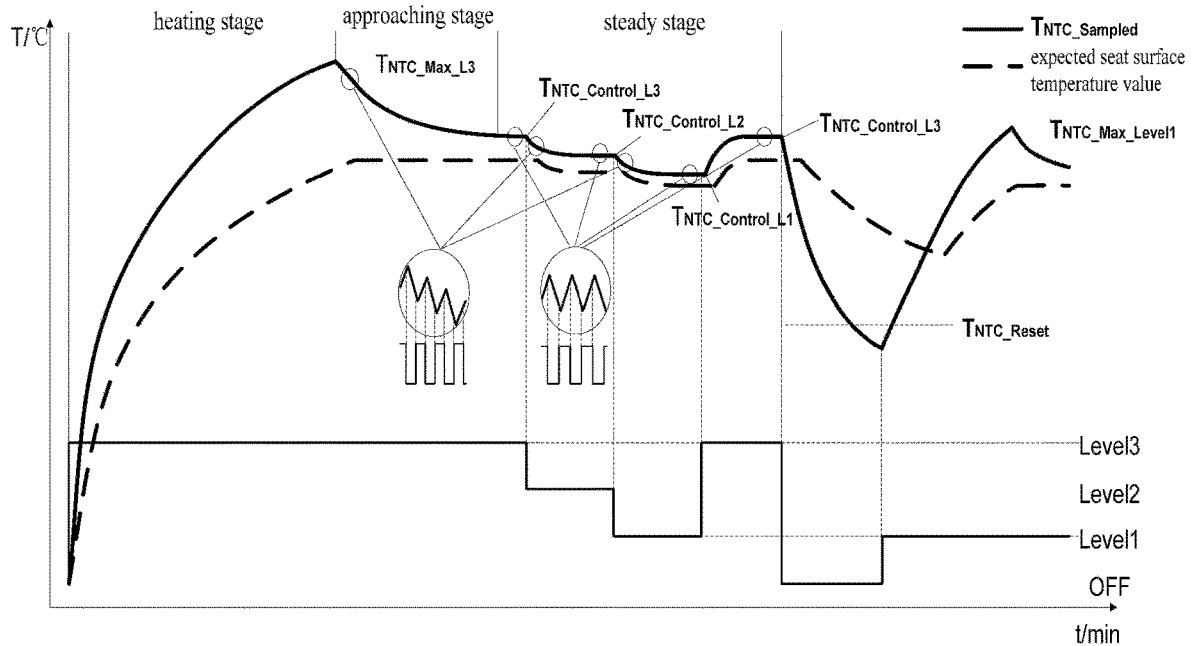
FIG. 7 is a temperature change curve graph of an application example of a temperature control method for vehicle seat heating provided by the present disclosure.

As shown in FIG. 7, a curve graph between an NTC temperature and an expected seat surface temperature when seat heating is performed by using a method provided by the present disclosure in one embodiment is shown. In order to understand all processes of the seat heating related by the present disclosure conveniently, a very complicated and complete seat heating process is shown in the figure, in which the switching of multiple levels is involved. It may be understood that the figure is merely for example and is not intended to limit. In actual application, it is unnecessary to include all steps therein and may only include a part of steps. For example, in some application examples, the switching of a level does not need to be performed.

Specifically, in FIG. 7, the seat heating apparatus is correspondingly provided with three heating levels, in which the third heating level is the strongest. According to a time shaft, the seat heating process undergoes the following process.

At Step 1: the seat heating apparatus is turned on and is set at the third level.

At Step 2: after the seat temperature is stable via a certain time, the level is reduced to the second level.

At Step 3: after the seat temperature is stable via a certain time, the level is reduced to the first level.

At Step 4: after the seat temperature is stable via a certain time, the level is switched to the third level again.

At Step 5: after the seat temperature is stable via a certain time, the seat heating apparatus is turned off.

At Step 6: the seat heating apparatus is turned on again after a certain time and the level is switched to the first level.

In FIG. 7, a change curve of a temperature value (see a curve above the right of FIG. 7) corresponding to an NTC sensor signal in each step and a temperature value (see a curve below the right of FIG. 7) measured on a seat surface is listed. Since the temperature on the seat surface cannot be measured via an HVSM apparatus, the method in the present disclosure mainly controls the temperature value T_NTC_Sampled corresponding to the NTC sensor signal. By controlling on-off of the seat heating apparatus, the T_NTC_Sampled changes in a set range and thus the seat surface temperature is guaranteed to quickly reach to and stabilize at an expected target temperature at each level.

In the table below, each parameter involved in FIG. 7 is defined as follows.

| Parameter | Definition/application |
|---|---|
| T_NTC_Max_Lx (x = 1/2/3) | Target temperature in initial heating stage: when the NTC temperature reaches to the temperature, the HCSM starts to enter approaching stage control. The target temperature value corresponding to each heating level is different and is determined via a preset test. Herein, the x represents a heating level. |
| T_NTC_Control_Lx (x = 1/2/3) | Corresponding NTC target temperature when the seat surface temperature is stable: at this moment, the NTC temperature changes within a certain range around the temperature point. The target temperature value corresponding to each heating level is different and is determined via a preset test. Herein, the x represents a heating level. |
| T_NTC_Reset | Temperature threshold value: it is used for confirm whether heating control needs to perform initial heating stage control and is determined by a calibration test. |

It may be seen from FIG. 7 that the NTC temperature control curve may be divided into three stages, including an initial heating stage, an approaching stage and a steady stage. FIG. 7 shows specific division positions of the three stages.

The initial heating stage refers to that when the heating is turned on from a relatively low temperature, the seat heating apparatus (such as a heating pad) is in an on state all the time so that the seat quickly reaches to a heat balance state. After the NTC temperature reaches to or exceeds the T_NTC_Control_Lx, the seat heating apparatus enters approaching stage control.

It may be understood that, when the heating is turned on, it is necessary to compare the NTC temperature with a temperature threshold value (T_NTC_Reset). If the current NTC temperature value is lower than the temperature threshold value, it is considered that the heat balance state no longer exists in the seat and the temperature control needs to be performed from the initial heating stage till the steady stage is entered again. In a typical situation in which the heating is turned off before the steady stage is entered, when the heating is turned on in a next time, if it is judged that the NTC temperature value at this moment is lower than the temperature threshold value, the initial heating stage needs to be completed continuously, and then the seat heating apparatus enters the approaching stage control and the steady stage control. The fifth step and the sixth step in FIG. 7 are such a situation.

The approaching stage refers to that after the NTC temperature reaches to the T_NTC_Control_Lx, an output power of the seat heating apparatus is reduced by controlling the seat heating apparatus (such as the heating pad) to turn on and turn off intermittently, so that the NTC temperature gradually approaches to the T_NTC_Control_Lx. The control strategy in the approaching stage will be described below in detail.

The steady stage refers to that after the NTC temperature reaches to a target control temperature T_NTC_Control_Lx of each level via the approaching stage, the NTC temperature is controlled around the T_NTC_Control_Lx, so that the seat surface temperature keeps stable all the time. The control strategy in the steady stage will be described below in detail.

It may be understood that, if the heating level changes in the heating process, the corresponding control parameters also change. However, the temperature control logic is unchanged.

The temperature control strategy and process in each of the approaching stage and the steady stage will be described below specifically with reference to examples.

(1) Temperature Control Strategy in Approaching Stage

Figure 8:
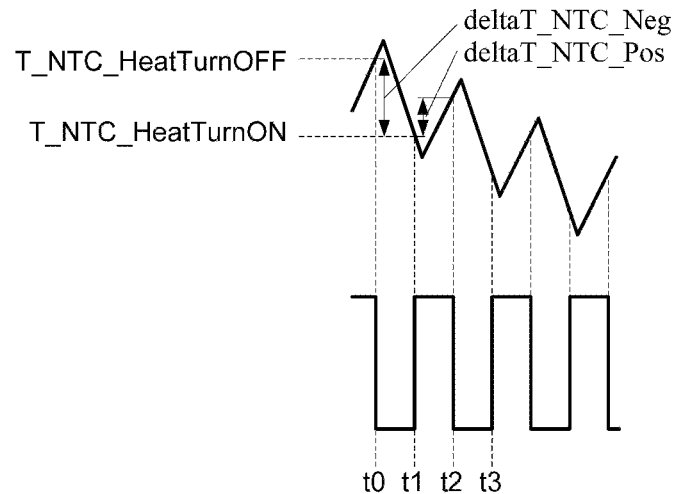
FIG. 8 is a schematic diagram of an approaching stage control principle in FIG. 7.

An NTC temperature curve in the approaching stage is as shown in FIG. 8, in which a pulse line below represents an on or off state of the seat heating apparatus, and a zigzag line above represents the NTC temperature curve in the approaching stage. By turning on and turning off the seat heating apparatus intermittently, the NTC temperature may be reduced according to a certain speed and approaches to the target temperature.

Specifically, the control logic of each on-off circulation (in an example, one on-off circulation may refer to turn off the heating, turn on the heating and turn off the heating again) is as follows: when the heating is turned on and the NTC temperature is increased to T_NTC_HeatTurnOFF, the seat heating apparatus is controlled to be turn off; and after the heating is turned off and when the NTC temperature is reduced to T_NTC_HeatTurnON, the seat heating apparatus is controlled to be turned on again. With such a circulation, it may be observed that:

$T\_NTC\_HeatTurnOFF(t0) = T\_NTC\_MAX\_Lx;$     Moment t0:

$T\_NTC\_HeatTurnON(t1) = T\_NTC\_HeatTurnOFF(t0) - \text{delta}T\_NTC\_Neg;$     Moment t1:

$T\_NTC\_HeatTurnOFF(t2) = T\_NTC\_HeatTurnON(t1) + \text{delta}T\_NTC\_Pos;$     Moment t2:

$T\_NTC\_HeatTurnON(t3) = T\_NTC\_HeatTurnOFF(t2) - \text{delta}T\_NTC\_Neg;$     Moment t3:

After the moment t3, the T_NTC_HeatTurnOFF value and the T_NTC_HeatTurnON value are calculated as above.

It is to be noted that, in this embodiment of the present disclosure, the deltaT-NTC-Neg in each on-off stage is a fixed value (hereinafter referred to as a temperature reduction value). In one example, the temperature reduction value may be 2° C. However, the deltaT-NTC-Pos (hereinafter referred to as a temperature rise value) is gradually increased. A change of the difference deltaT-NTC-Neg–deltaT-NTC-Pos is approximate to a power function curve and gradually approaches to zero. In this way, the tendency of the NTC temperature reduction is gradually decreased and at last stabilizes at T_NTC_Control_Lx.

To sum up, the off point temperature value and the on point temperature value in each on-off circulation may be calculated via the following formula.

$$T\_NTC\_HeatTurnOFF(n)=T\_NTC\_HeatTurnON(n-1)+\text{delta}T\_NTC\_Neg-\text{delta}T(n+1);$$

$$T\_NTC\_HeatTurnON(n)=T\_NTC\_HeatTurnOFF(n-1)-\text{delta}T\_NTC\_Neg;$$

$$T\_NTC\_HeatTurnOFF(0)-T\_NTC\_MAX\_Lx;$$

Where, the n is an $n^{th}$ time in the approaching stage that the heating is turned on or turned off in the current circulation, the T_NTC_HeatTurnOFF(n) is an off point temperature value when the heating is turned off at an $n^{th}$ time, the T_NTC_HeatTurnON(n−1) is an on point temperature value when the heating is turned on at an $(n-1)^{th}$ time, the T_NTC_HeatTurnON(n) is an on point temperature value when the heating is turned on at an $n^{th}$ time, T_NTC_HeatTurnOFF(n−1) is an off point temperature value when the heating is turned off at an $(n-1)^{th}$ time, the deltaT_NTC-Neg is a predetermined temperature reduction value, the deltaT(n+1) is a predetermined descending power function, and the T_NTC_MAX-Lx is a target temperature corresponding to the level in the initial heating stage.

It may be understood that, the deltaT(n) is a difference function between the temperature reduction value and the temperature rise value. In order to achieve the ideal control effect of the approaching stage, an actual deltaT(n) function corresponding to each heating level of the vehicle may be determined via the calibration test. For instance, in one example, the deltaT(n) corresponding to a certain level is $2.0604n^{-0.602}$.

When a difference between the T_NTC_HeatTurnOFF of the approaching stage and the T_NTC_HeatTurnOFF of the steady stage is equal to or smaller than a difference threshold value (deltaT_NTC_ApproachToStedy), it is indicated that the NTC temperature at this moment is close to the NTC target temperature and the approaching stage control should be switched to steady stage control. In one example, the difference threshold value may be 0.2° C.

(2) Temperature Control Strategy in Steady Stage

Figure 9:
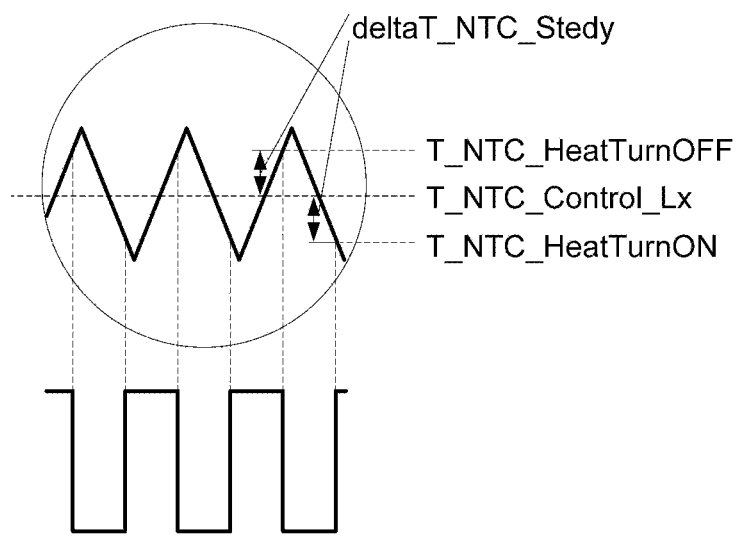
FIG. 9 is a schematic diagram of a steady stage control principle in FIG. 7.

A temperature control curve in the steady stage is as shown in FIG. 9, in which a pulse line below represents an on or off state of the seat heating apparatus, and a zigzag line above represents the NTC temperature curve. By turning on and turning off the seat heating apparatus intermittently in the steady stage, the NTC temperature stabilizes at the target temperature to fluctuate up and down.

It may be observed that the T_NTC_HeatTurnOFF and the T_NTC_HeatTurnON in the steady stage stabilize at the NTC target temperature (T_NTC_Control_Lx) to fluctuate up and down and thus may be determined according to the following formula.

$$T\_NTC\_HeatTurnOFF=T\_NTC\_Control\_Lx+\text{delta}T\_NTC\_Stedy:$$

$$T\_NTC\_HeatTurnON=T\_NTC\_Control\_Lx-\text{delta}T\_NTC\_Stedy.$$

It may be understood that the temperature reduction value deltaT_NTC_Neg of the NTC temperature is a fixed value no matter whether in the approaching stage or the steady stage. Therefore, deltaT_NTC_Stedy=deltaT_NTC_Neg/2.

When the deltaT_NTC_Neg is set at 2° C., it may be appropriate to fluctuate the NCT temperature value in the steady stage within a range of NTC target temperature ±1° C.

It may be understood that, T_NTC_HeatTurnOFF=T_NTC_Control_Lx+deltaT_NTC_Neg/2 in the steady stage. As a result, in the approaching stage, whether the NTC temperature approaches to the NTC target temperature corresponding to the level may be achieved by judging whether the NTC temperature meets the following formula:

$$T\_NTC\_HeatTurnOFF-(T\_NTC\_Control\_Lx+\text{delta}T\_NTC\_Neg/2)<=\text{delta}T\_NTC\_ApprochToStedy.$$

If the above formula is met, it is indicated that the NTC temperature in the approaching stage is close to the NTC target temperature.

By implementing the embodiments of the present disclosure, the following beneficial effects are achieved.

First of all, in the temperature control method and apparatus for the vehicle seat heating provided by the present disclosure, when the seat is heated, a segmental temperature control strategy is adopted, so the temperature control intervention time and the control process are more reasonable and the seat surface temperature can quickly reach to and stabilize at the expected value; specifically, when the seat heating is turned on for a first time, a current level is adopted to heat at a full power and the seat surface temperature rises quickly; when the seat surface NTC temperature value reaches to an initial target value, the seat heating apparatus is controlled according to the approaching stage control strategy, so that the seat heating apparatus is turned on and turned off intermittently and approaches to the expected temperature value quickly; and then, the steady stage control is entered and the seat surface temperature stabilizes around the expected temperature value all the time.

Then, after the heating level is switched, the present disclosure will correspondingly adjust control parameters in each heating stage, thus preventing the exaggerated change of the seat surface temperature.

By implementing the embodiments of the present disclosure, the comfort of the seat heating may be improved and the user may feel that the heating is quicker and the temperature is steadier.

The above are further detailed description of the present disclosure with reference to specific preferred implementation manners and cannot be considered that the specific implementation of the present disclosure is only limited to these description. Those of ordinary skill in the art may make a plurality of simple deviations or replacements without departing from the concept of the present disclosure, and all should pertain to the scope of protection of the claims.

What is claimed is:

1. A temperature control method for vehicle seat heating, comprising:

when turning on or switching to a heating level, determining a heating period at present according to a temperature value corresponding to a current Negative Temperature Coefficient (NTC) sensor, the heating period comprises an initial heating stage, an approaching stage and a steady stage; and controlling on-off of a seat heating apparatus segmentally according to a heating strategy corresponding to each heating period, so that the seat surface temperature reaches to and stabilizes at an expected target temperature of the level;

comparing the temperature value corresponding to the current NTC sensor with a predetermined temperature threshold value;

when a comparison result is that the temperature value corresponding to the current NTC sensor is less than the temperature threshold value, determining that the heating period at present is the initial heating stage;

if the heating period at present is the initial heating stage, controlling the seat heating apparatus to be in an on state all the time at the heating level till the temperature value corresponding to the NTC sensor reaches to a target temperature corresponding to the level in the initial heating stage and enabling the process to go to approaching stage control; and in an approaching stage control process, according to an approaching stage control strategy of the level, enabling the temperature value corresponding to the NTC sensor to gradually approach to an NTC target temperature corresponding to the level by controlling the seat heating apparatus to turn on and turn off intermittently, and after a predetermined condition is reached, enabling the process to go to steady stage control.

2. The temperature control method as claimed in claim 1, wherein the step of when turning on or switching to a heating level, determining a heating period at present according to a temperature value corresponding to a current NTC sensor further comprises:

when a comparison result is that the temperature value corresponding to the current NTC sensor is higher than or equal to the temperature threshold value, determining that the heating period at present is the steady stage.

3. The temperature control method as claimed in claim 2, wherein the step of controlling on-off of a seat heating apparatus segmentally according to a heating strategy corresponding to each heating period, so that the seat surface temperature reaches to and stabilizes at an expected target temperature of the level further comprises:

in a steady stage control process, according to a steady stage control strategy of the level, enabling the temperature value corresponding to the NTC sensor to fluctuate up and down at the NTC target temperature corresponding to the level by controlling the seat heating apparatus to turn on and turn off intermittently.

4. The temperature control method as claimed in claim 2, wherein the step of controlling on-off of a seat heating apparatus segmentally according to a heating strategy corresponding to each heating period, so that the seat surface temperature reaches to and stabilizes at an expected target temperature of the level specifically comprises:

if the heating period at present is the steady stage, according to a steady stage control strategy of the level, enabling the temperature value corresponding to the NTC sensor to fluctuate up and down at the NTC target temperature corresponding to the level by controlling the seat heating apparatus to turn on and turn off intermittently.

5. The temperature control method as claimed in claim 3, wherein the step of in an approaching stage control process, according to an approaching stage control strategy of the level, enabling the temperature value corresponding to the NTC sensor to gradually approach to an NTC target temperature corresponding to the level by controlling the seat heating apparatus to turn on and turn off intermittently and after a predetermined condition is reached, enabling the process to go to steady stage control specifically is as follows:

when the seat heating is performed and when the temperature value corresponding to the NTC sensor is increased to a corresponding off point temperature value in each on-off circulation, turning off the seat heating apparatus; and after the seat heating apparatus is turned off, when the temperature value corresponding to the NTC sensor is reduced to a corresponding on point temperature value, turning on the seat heating apparatus; wherein the off point temperature value and the on point temperature value in the each on-off circulation are calculated via the following formula:

$T\_NTC\_HeatTurnOFF(n) = T\_NTC\_HeatTurnON(n-1) + \text{delta}T\_NTC\_Neg - \text{delta}T(n+1);$ $T\_NTC\_HeatTurnON(n) = T\_NTC\_HeatTurnOFF(n-1) - \text{delta}T\_NTC\_Neg;$ $T\_NTC\_HeatTurnOFF(0) = T\_NTC\_MAX\_Lx;$ where, the n is an $n^{th}$ time in the approaching stage that the heating is turned on or turned off in the current circulation, the T_NTC_HeatTurnOFF(n) is an off point temperature value when the heating is turned off at an $n^{th}$ time, the T_NTC_HeatTurnON(n−1) is an on point temperature value when the heating is turned on at an $(n-1)^{th}$ time, the T_NTC_HeatTurnON(n) is an on point temperature value when the heating is turned on at an $n^{th}$ time, T_NTC_HeatTurnOFF(n−1) is an off point temperature value when the heating is turned off at an $(n-1)^{th}$ time, the deltaT NTC-Neg is a predetermined temperature reduction value, the deltaT(n+1) is a predetermined descending power function, and the T_NTC_MAX-Lx is a target temperature corresponding to the level in the initial heating stage.

6. The temperature control method as claimed in claim 5, wherein the step of in an approaching stage control process, according to an approaching stage control strategy of the level, enabling the temperature value corresponding to the NTC sensor to gradually approach to an NTC target temperature corresponding to the level by controlling the seat heating apparatus to turn on and turn off intermittently and after a predetermined condition is reached, enabling the process to go to steady stage control specifically further comprises:

when the following formula is met, determining the temperature value corresponding to the NTC sensor to approach to the NTC target temperature corresponding to the level and enabling the process to go to the steady stage control:

$T\_NTC\_HeatTurnOFF - (T\_NTC\_Control\_Lx + \text{delta}T\_NTC\_Neg/2) \leq \text{delta}T\_NTC\_ApprochToStedy,$ where the T_NTC_Control_Lx is the NTC target temperature corresponding to the level, the deltaT_NTC-Neg is a predetermined temperature reduction value, and the deltaT_NTC_ApprochToStedy is a predetermined difference judgment threshold value.

7. The temperature control method as claimed in claim 6, wherein the step of in a steady stage control process, according to a steady stage control strategy of the level, enabling the temperature value corresponding to the NTC sensor to fluctuate up and down at the NTC target temperature corresponding to the level by controlling the seat heating apparatus to turn on and turn off intermittently and after a predetermined condition is reached, enabling the process to go to steady stage control specifically is as follows:

when the seat heating is performed and the temperature value corresponding to the NTC sensor is increased to an off point temperature value in the steady stage, turning off the seat heating apparatus; and after the seat heating apparatus is turned off, when the temperature value corresponding to the NTC sensor is reduced to an on point temperature value in the steady stage, turning on the seat heating apparatus, wherein the off point temperature value and the on point temperature value in the steady stage are calculated via the following formula:

$$T\_NTC\_HeatTurnOFF=T\_NTC\_Control\_Lx+deltaT\_NTC\_Neg/2;$$

$$T\_NTC\_HeatTurnON=T\_NTC\_Control\_Lx-deltaT\_NTC\_Neg/2;$$

where the T_NTC_HeatTurnOFF is the off point temperature value in the steady stage, the T_NTC_HeatTurnON is the on point temperature value in the steady stage, the T_NTC_Control_Lx is an NTC target temperature corresponding to the level, and the deltaT_NTC_Neg is a predetermined temperature reduction value.

8. The temperature control method as claimed in claim 7, further comprising:
presetting a target temperature, an NTC target temperature, a temperature reduction value, a difference judgment threshold value and an ascending power function corresponding to the each heating level in the initial heating stage and storing them.

9. A temperature control apparatus for vehicle seat heating, comprising:
a level heating period judgment unit, configured to determine, when a certain heating level is turned on or is switched to, a heating period at present according to a temperature value corresponding to a current NTC sensor, the heating period comprising an initial heating stage, an approaching stage and a steady stage; and
a segmental control unit, configured to segmentally control on-off of a seat heating apparatus according to a heating strategy corresponding to each heating period, so that the seat surface temperature reaches to and stabilizes at an expected target temperature of the level;
wherein the level heating period judgment unit further comprises a comparison unit and a heating period determination unit, the comparison unit is configured to compare a temperature value corresponding to the current NTC sensor with a predetermined temperature threshold value, the heating period determination unit is configured to determine, when a comparison result is that the temperature value corresponding to the current NTC sensor is less than the temperature threshold value, the heating period at present as the initial heating stage;
wherein the segmental control unit comprises an initial heating stage control unit and an approaching stage control unit, the initial heating stage control unit is configured to control the seat heating apparatus to be in an on state all the time at the heating level till the temperature value corresponding to the NTC sensor reaches to a target temperature corresponding to the level in the initial heating stage; the approaching stage control unit is configured to enable, when the heating period at present is in the approaching stage, according to an approaching stage control strategy of the level, the temperature value corresponding to the NTC sensor to gradually approach to an NTC target temperature corresponding to the level by controlling the seat heating apparatus to turn on and turn off intermittently.

10. The temperature control apparatus as claimed in claim 9, wherein the heating period determination unit, further configured to determine, when a comparison result is that the temperature value corresponding to the current NTC sensor is higher than or equal to the temperature threshold value, the heating period at present as the steady stage.

11. The temperature control apparatus as claimed in claim 10, wherein the segmental control unit further comprises:
a steady stage control unit, configured to enable, when the heating period at present is in the steady stage, according to a steady stage control strategy of the level, the temperature value corresponding to the NTC sensor to fluctuate up and down at the NTC target temperature corresponding to the level by controlling the seat heating apparatus to turn on and turn off intermittently.

12. The temperature control apparatus as claimed in claim 11, wherein the approaching stage control unit comprises:
an approaching stage heating switch control unit, configured to turn off, when the seat heating is performed and when the temperature value corresponding to the NTC sensor is increased to a corresponding off point temperature value in each on-off circulation, the seat heating apparatus; and turn on, after the seat heating apparatus is turned off, when the temperature value corresponding to the NTC sensor is reduced to a corresponding on point temperature value, the seat heating apparatus, wherein
the off point temperature value and the on point temperature value in the each on-off circulation are calculated via the following formula:

$$T\_NTC\_HeatTurnOFF(n)=T\_NTC\_HeatTurnON(n-1)+deltaT\_NTC\_Neg-deltaT(n+1);$$

$$T\_NTC\_HeatTurnON(n)=T\_NTC\_HeatTurnOFF(n-1)-deltaT\_NTC\_Neg;$$

$$T\_NTC\_HeatTurnOFF(0)=T\_NTC\_MAX\_Lx;$$

where, the n is an $n^{th}$ time in the approaching stage that the heating is turned on or turned off in the current circulation, the T_NTC_HeatTurnOFF(n) is an off point temperature value when the heating is turned off at an $n^{th}$ time, the T_NTC_HeatTurnON(n−1) is an on point temperature value when the heating is turned on at an $(n-1)^{th}$ time, the T_NTC_HeatTurnON(n) is an on point temperature value when the heating is turned on at an $n^{th}$ time, T_NTC_HeatTurnOFF(n−1) is an off point temperature value when the heating is turned off at an $(n-1)^{th}$ time, the deltaT_NTC-Neg is a predetermined temperature reduction value, the deltaT(n+1) is a predetermined descending power function, and the T_NTC_MAX-Lx is a target temperature corresponding to the level in the initial heating stage.

13. The temperature control apparatus as claimed in claim 12, wherein the approaching stage control unit further comprises:
an approaching judgment unit, configured to determine, when the following formula is met, the temperature value corresponding to the NTC sensor to approach to the NTC target temperature corresponding to the level:

$$T\_NTC\_HeatTurnOFF-(T\_NTC\_Control\_Lx+deltaT\_NTC\_Neg/2)<=deltaT\_NTC\_ApprochToStedy,$$

where the T_NTC_Control_Lx is the NTC target temperature corresponding to the level, the deltaT_NTC-Neg is a predetermined temperature reduction value, and the deltaT_NTC_ApprochToStedy is a predetermined difference judgment threshold value.

14. The temperature control apparatus as claimed in claim 13, wherein the steady stage control unit specifically comprises:
a steady stage heating switch control unit, configured to turn off, when the seat heating is performed and when the temperature value corresponding to the NTC sensor is increased to an off point temperature value in the steady stage, the seat heating apparatus; and turn on, after the seat heating apparatus is turned off, when the temperature value corresponding to the NTC sensor is reduced to an on point temperature value in the steady stage, the seat heating apparatus, wherein
the off point temperature value and the on point temperature value in the steady stage are calculated via the following formula:

$$T\_NTC\_HeatTurnOFF = T\_NTC\_Control\_Lx + deltaT\_NTC\_Neg/2;$$

$$T\_NTC\_HeatTurnON = T\_NTC\_Control\_Lx - deltaT\_NTC\_Neg/2;$$

where the T_NTC_HeatTurnOFF is the off point temperature value in the steady stage, the T_NTC_HeatTurnON is the on point temperature value in the steady stage, the T_NTC_Control_Lx is an NTC target temperature corresponding to the level, and the deltaT_NTC_Neg is a predetermined temperature reduction value.

15. The temperature control apparatus as claimed in claim 14, further comprising:
a presetting and storage unit, configured to preset a target temperature, an NTC target temperature, a temperature reduction value, a temperature threshold value, a difference judgment threshold value and an ascending power function corresponding to the each heating level in the initial heating stage and store them.

16. A temperature control system for vehicle seat heating, comprising:
a temperature sensor, arranged in a vehicle seat and is configured to detect a temperature on a surface of the vehicle seat;
a control apparatus, comprising a temperature control apparatus for the vehicle seat heating; and
a seat heating apparatus, configured to heat the vehicle seat according to the control of a segmental control apparatus, wherein
the temperature control apparatus for the vehicle seat heating comprises:
a level heating period judgment unit, configured to determine, when a certain heating level is turned on or is switched to, a heating period at present according to a temperature value corresponding to a current NTC sensor, the heating period comprising an initial heating stage, an approaching stage and a steady stage; and
a segmental control unit, configured to segmentally control on-off of a seat heating apparatus according to a heating strategy corresponding to each heating period, so that the seat surface temperature reaches to and stabilizes at an expected target temperature of the level;
wherein the level heating period judgment unit further comprises a comparison unit and a heating period determination unit, the comparison unit is configured to compare a temperature value corresponding to the current NTC sensor with a predetermined temperature threshold value, the heating period determination unit is configured to determine, when a comparison result is that the temperature value corresponding to the current NTC sensor is less than the temperature threshold value, the heating period at present as the initial heating stage; and
wherein the segmental control unit comprises an initial heating stage control unit and an approaching stage control unit, the initial heating stage control unit is configured to control the seat heating apparatus to be in an on state all the time at the heating level till the temperature value corresponding to the NTC sensor reaches to a target temperature corresponding to the level in the initial heating stage; the approaching stage control unit is configured to enable, when the heating period at present is in the approaching stage, according to an approaching stage control strategy of the level, the temperature value corresponding to the NTC sensor to gradually approach to an NTC target temperature corresponding to the level by controlling the seat heating apparatus to turn on and turn off intermittently.

17. The system as claimed in claim 16, wherein
the heating period determination unit, further configured to determine, when a comparison result is that the temperature value corresponding to the current NTC sensor is higher than or equal to the temperature threshold value, the heating period at present as the steady stage.

18. The system as claimed in claim 17, wherein the segmental control unit further comprises:
a steady stage control unit, configured to enable, when the heating period at present is in the steady stage, according to a steady stage control strategy of the level, the temperature value corresponding to the NTC sensor to fluctuate up and down at the NTC target temperature corresponding to the level by controlling the seat heating apparatus to turn on and turn off intermittently.

19. The system as claimed in claim 18, wherein the approaching stage control unit comprises:
an approaching stage heating switch control unit, configured to turn off, when the seat heating is performed and when the temperature value corresponding to the NTC sensor is increased to a corresponding off point temperature value in each on-off circulation, the seat heating apparatus; and turn on, after the seat heating apparatus is turned off, when the temperature value corresponding to the NTC sensor is reduced to a corresponding on point temperature value, the seat heating apparatus, wherein
the off point temperature value and the on point temperature value in the each on-off circulation are calculated via the following formula:

$$T\_NTC\_HeatTurnOFF(n) = T\_NTC\_HeatTurnON(n-1) + deltaT\_NTC\_Neg - deltaT(n+1);$$

$$T\_NTC\_HeatTurnON(n) = T\_NTC\_HeatTurnOFF(n-1) - deltaT\_NTC\_Neg;$$

$$T\_NTC\_HeatTurnOFF(0) = T\_NTC\_MAX\_Lx;$$

where, the n is an $n^{th}$ time in the approaching stage that the heating is turned on or turned off in the current circulation, the T_NTC_HeatTurnOFF(n) is an off point temperature value when the heating is turned off at an $n^{th}$ time, the T_NTC_HeatTurnON(n−1) is an on point temperature value when the heating is turned on at an $(n-1)^{th}$ time, the T_NTC_HeatTurnON(n) is an on point temperature value when the heating is turned on at an $n^{th}$ time, T_NTC_HeatTurnOFF(n−1) is an off point temperature value when the heating is turned off at an $(n-1)^{th}$ time, the deltaT_NTC-Neg is a predetermined temperature reduction value, the deltaT(n+1) is a predetermined descending power function, and the T_NTC_MAX-Lx is a target temperature corresponding to the level in the initial heating stage.

20. The system as claimed in claim 19, wherein the approaching stage control unit further comprises:

an approaching judgment unit, configured to determine, when the following formula is met, the temperature value corresponding to the NTC sensor to approach to the NTC target temperature corresponding to the level:

$$T\_NTC\_HeatTurnOFF - (T\_NTC\_Control\_Lx + deltaT\_NTC\_Neg/2) <= deltaT\_NTC\_ApprochToStedy,$$

where the T_NTC_Control_Lx is the NTC target temperature corresponding to the level, the deltaT_NTC-Neg is a predetermined temperature reduction value, and the deltaT_NTC_ApprochToStedy is a predetermined difference judgment threshold value.

* * * * *